(12) United States Patent
Kerstetter et al.

(10) Patent No.: US 12,086,415 B2
(45) Date of Patent: Sep. 10, 2024

(54) FREQUENCY REGULATION FOR MEMORY MANAGEMENT COMMANDS

(71) Applicant: Micron Technology, Inc., Boise, ID (US)

(72) Inventors: Bryan David Kerstetter, Kuna, ID (US); Donald Martin Morgan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 17/662,187

(22) Filed: May 5, 2022

(65) Prior Publication Data

US 2023/0359361 A1 Nov. 9, 2023

(51) Int. Cl.
*G06F 3/06* (2006.01)
(52) U.S. Cl.
CPC .......... *G06F 3/0613* (2013.01); *G06F 3/0619* (2013.01); *G06F 3/0659* (2013.01); *G06F 3/0679* (2013.01)
(58) Field of Classification Search
CPC .... G06F 3/0613; G06F 3/0619; G06F 3/0659; G06F 3/0679
See application file for complete search history.

(56) References Cited

U.S. PATENT DOCUMENTS

| | | | |
|---|---|---|---|
| 2019/0228813 A1* | 7/2019 | Nale | G11C 11/40611 |
| 2020/0111525 A1* | 4/2020 | Cowles | G11C 11/40611 |
| 2021/0012832 A1* | 1/2021 | Devaux | G06F 13/1668 |
| 2022/0004341 A1* | 1/2022 | Chen | G06F 3/0659 |
| 2022/0113868 A1* | 4/2022 | Cowles | G06F 3/0653 |

* cited by examiner

*Primary Examiner* — Michael Krofcheck
*Assistant Examiner* — Janice M. Girouard
(74) *Attorney, Agent, or Firm* — Holland & Hart LLP

(57) ABSTRACT

Methods, systems, and devices for frequency regulation for memory management commands are described. A memory device may maintain a respective first counter and second counter for each monitoring area of the memory device, where the counters may be incremented for each activate command received for the corresponding monitoring area. If the first counter satisfies a first threshold, an activate command issued to the monitoring area may be ignored. If the second counter fails to satisfy a second threshold, a memory management command issued to the monitoring area may be ignored and the memory device may maintain a value of the second counter, while decrementing the first counter. Alternatively, if the second counter satisfies the second threshold, the memory device may perform a memory management operation associated with a received memory management command and may decrement the first counter and the second counter.

27 Claims, 7 Drawing Sheets

FREQUENCY REGULATION FOR MEMORY MANAGEMENT COMMANDS

FIELD OF TECHNOLOGY

The following relates to one or more systems for memory, including frequency regulation for memory management commands.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source. In some cases, non-volatile memory cells may be larger than volatile memory cells, but memory devices including non-volatile memory cells may be able to achieve densities similar to memory devices including volatile memory cells by decreasing memory cell size.

DETAILED DESCRIPTION

Figure 1:
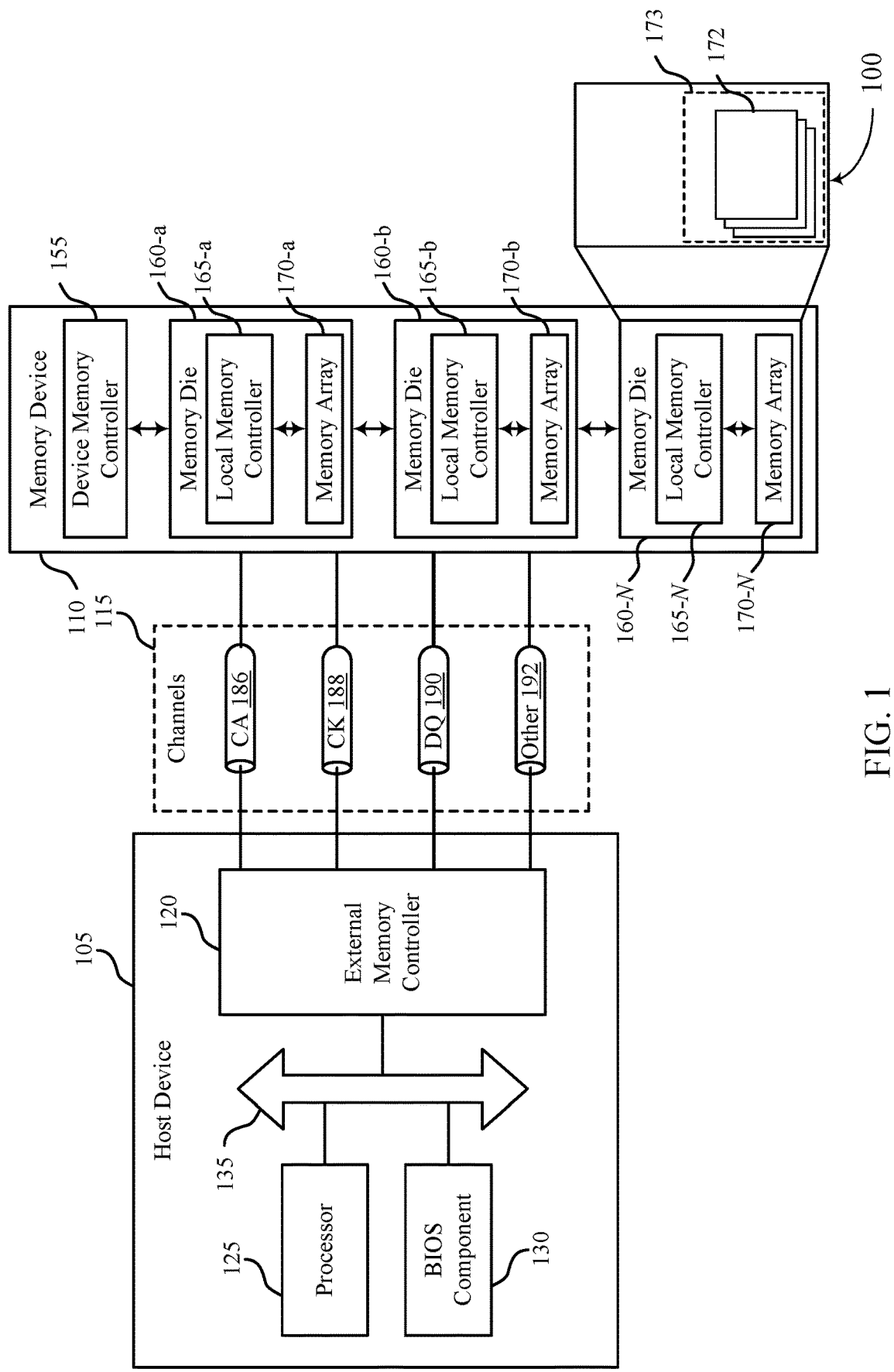
FIG. 1 illustrates an example of a system that supports frequency regulation for memory management commands in accordance with examples as disclosed herein.

A memory device may include one or more monitoring areas, which, for example, may each include a set of one or more memory banks. The memory device may maintain a respective first counter for each monitoring area, where the first counter may track a quantity of activate commands issued to the respective monitoring area (e.g., issued to bank(s) of the monitoring area). The first counter may be incremented for each activate command received for the monitoring area. Issuing a memory management command to the monitoring area may result in decrementing the first counter by a defined quantity. The memory device may also maintain a first threshold associated with the monitoring areas of the memory device, where the first threshold may be indicative of a quantity of activate operations a monitoring area may support without memory management operations (e.g., to mitigate the effects of repeated access such as during a row hammer attack). If a first counter reaches the first threshold, no additional activate commands may be issued to the corresponding monitoring area (e.g., until one or more memory management commands are issued thereto, which may reduce the first counter below the first threshold). If the first counter reaches a value of greater than or equal to (e.g., satisfies) the first threshold (e.g., a maximum counter value), an activate command that may be issued to the corresponding monitoring area may be ignored. For example, if a host or other device issues an activate command to the monitoring area, the memory device may determine whether the first counter satisfies the first threshold. If the first counter satisfies the first threshold, the memory device may ignore the activate command issued to the monitoring area, and not update the first counter.

In some cases, a relatively higher quantity of memory management commands issued to a memory device may result in increased power consumption and/or may be used as a hammering technique to support unauthorized access. For example, power consumption may be increased if memory management commands are issued at a relatively higher frequency. Similarly, a hacker or other security risk may use memory management commands to initiate a wear leveling cycle with an address scramble, which a hacker or other security risk may use to determine how data is moved across a memory array and how that movement is related to the address scramble, which may lead to deciphering the address scramble. Based on a knowledge of the address scramble, the hacker or other security risk may launch an attack to inject errors at one or more physical addresses (e.g., cause a bit flip or physical failure of one or more memory cells that corrupts data in a malicious way).

In order to reduce such security risks, the memory device may ignore (e.g., suppress) one or more memory management commands, while still upholding a remainder of the memory management commands (e.g., to mitigate device wear), which may, for example, reduce power consumption and increase device security. For example, the memory device may maintain a respective second counter for each monitoring area, where the second counter may be used to determine whether to perform a memory management command for the corresponding monitoring area. The second counter may be incremented for each activate command received for a corresponding monitoring area, and may be associated with a second threshold. If the second counter satisfies (e.g., is greater than or equal to) a second threshold upon reception of a memory management command, the memory device may perform a memory management operation associated with the memory management command and may decrement the first counter and second counter. If the second counter fails to satisfy (e.g., is less than) the second threshold upon reception of the memory management command, the memory device may suppress (e.g., ignore) performance of the memory management operation. In such cases, the memory device may maintain a value of the second counter in response to the memory management command, while decrementing the first counter. While the techniques are described herein with reference to one or more types of memory, the same techniques may apply to one or more other types of memory without departing from the scope of the present disclosure. For example, the techniques described herein may apply to any type of memory (e.g., dynamic random access memory (DRAM)) to which one or more commands described herein apply (e.g., activate commands, memory management commands).

Features of the disclosure are initially described in the context of systems and dies as described with reference to FIGS. 1 and 2. Features of the disclosure are described in the context of a timing diagram and a flow chart as described with reference to FIGS. 3 and 4. These and other features of the disclosure are further illustrated by and described with reference to an apparatus diagram and flowcharts that relate to frequency regulation for memory management commands as described with reference to FIGS. 5-7.

FIG. 1 illustrates an example of a system 100 that supports frequency regulation for memory management commands in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks 172, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A memory device 110 may include one or more monitoring areas 173, which, for example, may each include a set of one or more memory banks 172. The memory device 110 may maintain a respective first counter for each monitoring area 173, where the first counter may track a quantity of activate commands issued to the respective monitoring area 173 (e.g., issued to bank(s) of the monitoring area 173). The first counter may be incremented for each activate command received for the monitoring area 173. Issuing a memory management command to the monitoring area 173 may result in decrementing the first counter by a defined quantity. The memory device 110 may also maintain a first threshold associated with the monitoring areas 173 of the memory device 110, where the first threshold may be indicative of a quantity of activate operations a monitoring area 173 may support without memory management operations (e.g., to mitigate the effects of repeated access such as during a row hammer attack). If the first counter reaches a value of greater than or equal to (e.g., satisfies) the first threshold (e.g., a maximum counter value), an activate command that may be issued to the corresponding monitoring area may be ignored. For example, if a host device 105 or other device issues an activate command to the monitoring area 173, the memory device 110 may determine whether the first counter satisfies the first threshold. If the first counter satisfies the first threshold, the memory device 110 may ignore the activate command issued to the monitoring area 173, and not update the first counter.

In some cases, the memory device 110 may additionally or alternatively ignore (e.g., suppress) one or more memory management commands, while still upholding a remainder of the memory management commands (e.g., to mitigate device wear), which may, for example, reduce power consumption and increase device security. For example, the memory device 110 may maintain a respective second counter, in addition to the first counter, for each monitoring area 173, where the second counter may be used to determine whether to perform a memory management command for the corresponding monitoring area 173. The second counter may be incremented for each activate command received for a corresponding monitoring area 173, and may be associated with a second threshold. If a memory management command is received for a monitoring area 173, the second counter for that monitoring area 173 may be compared to the second threshold. If the second counter satisfies (e.g., is greater than or equal to) the second threshold upon reception of the memory management command, the memory device 110 may perform a memory management operation associated with the memory management command and may decrement the first counter and second counter by a same amount. If the second counter fails to satisfy (e.g., is less than) the second threshold upon reception of the memory management command, the memory device 110 may suppress (e.g., ignore) performance of a memory management operation associated with the memory management command. In such cases, the memory device 110 may also maintain a value of the second counter in response to the memory management command, while decrementing the first counter.

Figure 2:
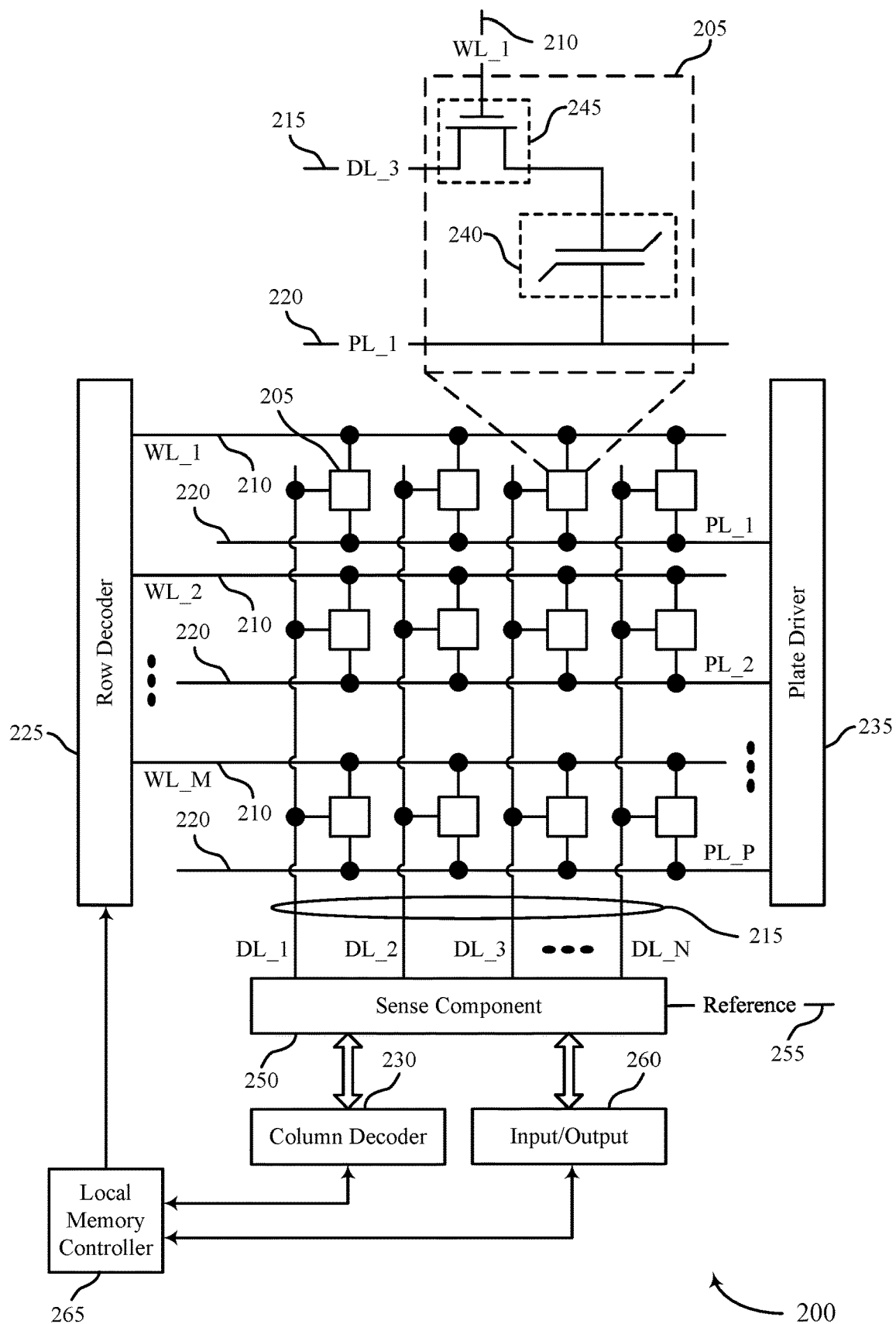
FIG. 2 illustrates an example of a memory die that supports frequency regulation for memory management commands in accordance with examples as disclosed herein.

FIG. 2 illustrates an example of a memory die 200 that supports frequency regulation for memory management commands in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a state (e.g., polarization state or dielectric charge) representative of the programmable states in a capacitor. In FeRAM architectures, the memory cell 205 may include a capacitor 240 that includes a ferroelectric material to store a charge and/or a polarization representative of the programmable state. The memory cell 205 may include a logic storage component, such as capacitor 240, and a switching component 245 (e.g., a cell selection component). The capacitor 240 may be an example of a ferroelectric capacitor. A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components.

The memory die 200 may include access lines (e.g., word lines 210, digit lines 215, and plate lines 220) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding. Memory cells 205 may be positioned at intersections of the word lines 210, the digit lines 215, and/or the plate lines 220.

Operations such as reading and writing may be performed on memory cells 205 by activating access lines such as a word line 210, a digit line 215, or a plate line 220. By biasing a word line 210, a digit line 215, and a plate line 220 (e.g., applying a voltage to the word line 210, digit line 215, or plate line 220), a single memory cell 205 may be accessed at their intersection. The intersection of a word line 210 and a digit line 215 in a two-dimensional or in a three-dimensional configuration may be referred to as an address of a memory cell 205. Activating a word line 210, a digit line 215, or a plate line 220 may include applying a voltage to the respective line.

Accessing the memory cells 205 may be controlled through a row decoder 225, a column decoder 230, or a plate driver 235, or a combination thereof. For example, a row decoder 225 may receive a row address from the local memory controller 265 and activate a word line 210 based on the received row address. A column decoder 230 receives a column address from the local memory controller 265 and activates a digit line 215 based on the received column address. A plate driver 235 may receive a plate address from the local memory controller 265 and activates a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

A word line 210 may be a conductive line in electronic communication with a memory cell 205 that is used to perform access operations on the memory cell 205. In some architectures, the word line 210 may be in electronic communication with a gate of a switching component 245 of a memory cell 205 and may be operable to control the switching component 245 of the memory cell. In some architectures, the word line 210 may be in electronic communication with a node of the capacitor of the memory cell 205 and the memory cell 205 may not include a switching component.

A digit line 215 may be a conductive line that couples the memory cell 205 with a sense component 250. In some architectures, the memory cell 205 may be selectively coupled with the digit line 215 during portions of an access operation. For example, the word line 210 and the switching component 245 of the memory cell 205 may be operable to selectively couple or isolate the capacitor 240 of the memory cell 205 and the digit line 215. In some architectures, the memory cell 205 may be in electronic communication (e.g., constant) with the digit line 215.

A plate line 220 may be a conductive line in electronic communication with a memory cell 205 that is used to perform access operations on the memory cell 205. The plate line 220 may be in electronic communication with a node (e.g., the cell bottom) of the capacitor 240. The plate line 220 may cooperate with the digit line 215 to bias the capacitor 240 during access operation of the memory cell 205.

The sense component 250 may determine a state (e.g., a polarization state or a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage). The detected logic state of the memory cell 205 may be provided as an output of the sense component 250 (e.g., to an input/output 260), and may indicate the detected logic state to another component of a memory device (e.g., a memory device 110) that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 265 may generate row signals and column address signals to activate the target word line 210, the target digit line 215, and the target plate line 220. The local memory controller 265 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

The local memory controller 265 may be operable to perform a read operation (e.g., a sense operation) on one or more memory cells 205 of the memory die 200. During a read operation, the state (e.g., logic state, charge state, polarization state) stored in a memory cell 205 of the memory die 200 may be evaluated (e.g., read, determined, identified). The local memory controller 265 may identify a target memory cell 205 on which to perform the read operation. The local memory controller 265 may identify a target word line 210, a target digit line 215, and target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The target memory cell 205 may transfer a signal (e.g., charge, voltage) to the sense component 250 in response to biasing the access lines. The sense component 250 may amplify the signal. The local memory controller 265 may activate the sense component 250 (e.g., latch the sense component) and compare the signal received from the memory cell 205 to a reference (e.g., the reference 255). Based on that comparison, the sense component 250 may determine a logic state that is stored on the memory cell 205.

A memory device may include one or more monitoring areas, which, for example, may each include a set of one or more memory banks. The memory device may maintain a respective first counter for each monitoring area, where the first counter may track a quantity of activate commands issued to the respective monitoring area (e.g., issued to bank(s) of the monitoring area). The first counter may be incremented for each activate command received for the monitoring area. Issuing a memory management command to the monitoring area may result in decrementing the first counter by a defined quantity. The memory device may also maintain a first threshold associated with the monitoring areas of the memory device, where the first threshold may be indicative of a quantity of activate operations a monitoring area may support without memory management operations (e.g., to mitigate the effects of repeated access such as during a row hammer attack). If the first counter reaches a value of greater than or equal to (e.g., satisfies) the first threshold (e.g., a maximum counter value), an activate command that may be issued to the corresponding monitoring area may be ignored. For example, if a host device 105 or other device issues an activate command to the monitoring area, the memory device may determine whether the first counter satisfies the first threshold. If the first counter satisfies the first threshold, the memory device may ignore the activate command issued to the monitoring area, and not update the first counter.

In some cases, the memory device may additionally or alternatively ignore (e.g., suppress) one or more memory management commands, while still upholding a remainder of the memory management commands (e.g., to mitigate device wear), which may, for example, reduce power consumption and increase device security. For example, the memory device may maintain a respective second counter, in addition to the first counter, for each monitoring area, where the second counter may be used to determine whether to perform a memory management command for the corresponding monitoring area. The second counter may be incremented for each activate command received for a corresponding monitoring area, and may be associated with a second threshold. If a memory management command is received for a monitoring area, the second counter for that monitoring area may be compared to the second threshold. If the second counter satisfies (e.g., is greater than or equal to) the second threshold upon reception of the memory management command, the memory device may perform a memory management operation associated with the memory management command and may decrement the first counter and second counter by a same amount. If the second counter fails to satisfy (e.g., is less than) the second threshold upon reception of the memory management command, the memory device may suppress (e.g., ignore) performance of a memory management operation associated with the memory management command. In such cases, the memory device may also maintain a value of the second counter in response to the memory management command, while decrementing the first counter.

Figure 3:
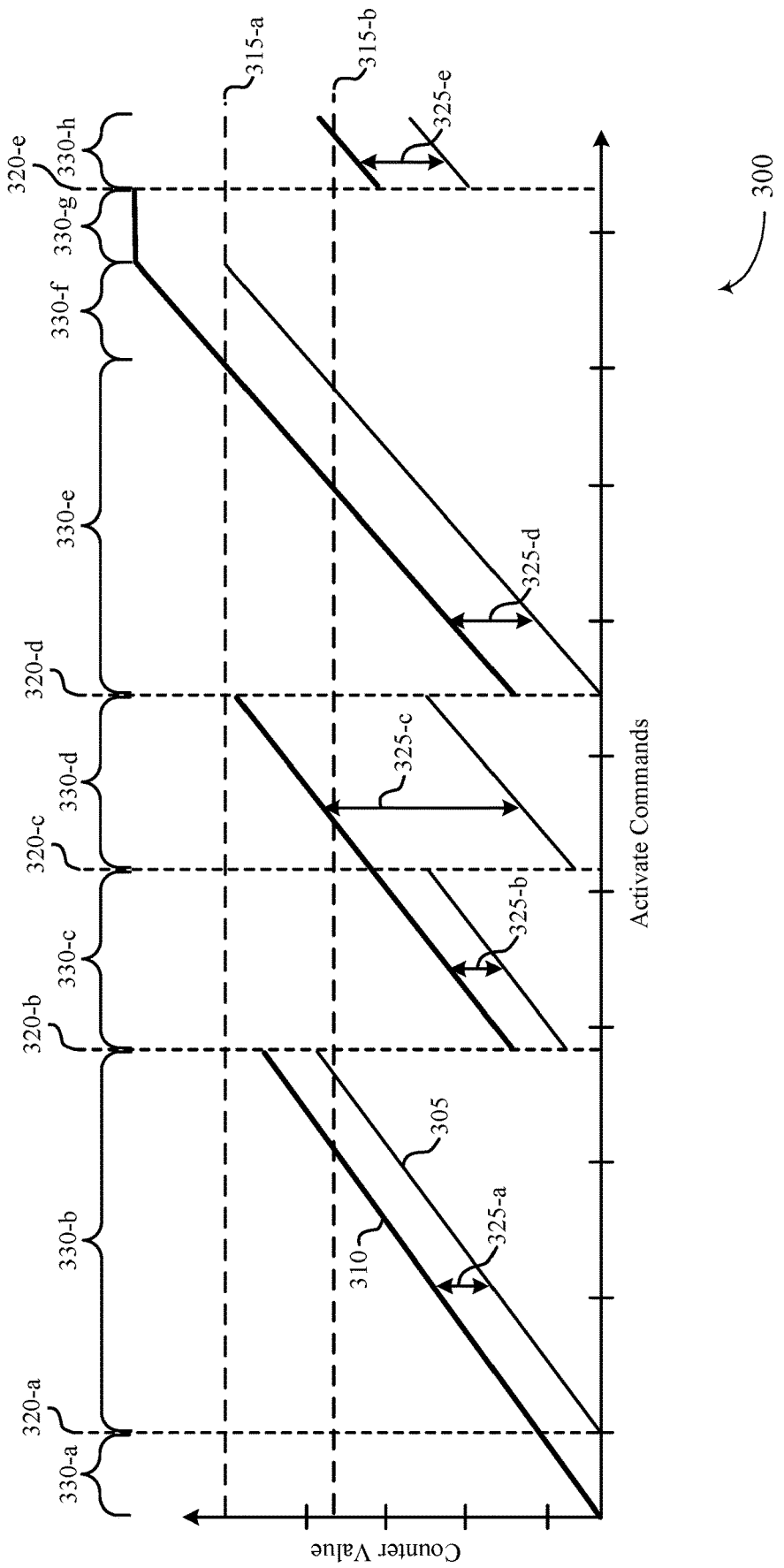
FIG. 3 illustrates an example of a timing diagram that supports frequency regulation for memory management commands in accordance with examples as disclosed herein.

FIG. 3 illustrates an example of a timing diagram 300 that supports frequency regulation for memory management commands in accordance with examples as disclosed herein. The timing diagram 300 may illustrate the operation of a memory device as described with reference to FIGS. 1 and 2. The memory device may be an example of a memory device 110 described with reference to FIG. 1, which may include one or more memory dies 200 as described with reference to FIG. 2. The timing diagram 300 may depict a plot of activate commands against one or more counter values. The timing diagram 300 may illustrate the operation of the memory device based on the counter values.

In some examples, the memory device may include one or more monitoring areas, which, for example, may include a memory bank or a group of memory banks (e.g., multiple memory banks) of the memory device. For example, a monitoring area may include a set of one or more memory banks. The memory device may maintain a respective first counter 305 for each monitoring area. A first counter 305 may be, as an example, a rolling accumulated activate (RAA) count for a corresponding monitoring area, and may be associated with a controller of the memory device (e.g., the first counter 305 may be synced with a controller count or may be maintained on the controller). For example, the first counter 305 may track a quantity of activate operations (e.g., associated with write operations, read operations) issued to the monitoring area (e.g., received by the bank(s) of the monitoring area) and may increment for each activate command received for the monitoring area.

As described herein, an activate command may be a command (e.g., a standardized command) that may indicate for a memory device to activate a word line and/or digit line(s) associated with one or more memory cells. As such, the data stored at the memory cells may be accessed in order to perform an operation, such as a write operation, read operation, refresh operation, or a memory management operation, among other examples. As described herein, a memory management command may be a command (e.g., a standardized command) that may indicate for a memory device to perform one or more memory management operations (e.g., data management, refresh, wear leveling) on one or more memory cells.

The memory device may issue a memory management command 320 (e.g., a refresh command or other command based on memory activity, such as an activate based mode command) to a corresponding monitoring area. Issuing the memory management command 320 may result in updating a row offset pointer (e.g., based on a change in physical to logical address mapping), as well as decrementing the first counter 305 by a defined quantity (e.g., a counter decrement value, as defined by an RAA decrement per memory management command (RAADEC)). The first counter 305 may, for example, be decremented to a value of zero, but may not be further decremented (e.g., to a negative value, a "pull-in" value). In some cases, memory management commands 320 may accumulate or postpone for a respective monitoring area. The memory device may also maintain a first threshold 315-a associated with the monitoring areas. The first threshold 315-a may be, as an example, an RAA maximum management threshold (RAAMMT), and may be indicative of a quantity of activate operations a monitoring area may support without memory management operations (e.g., to mitigate the effects of repeated access such as during a row hammer attack).

The first threshold 315-a and the counter decrement value may be based on an RAA initial management threshold (RAAIMT). For example, the first threshold 315-a, the counter decrement value, or both may be a respective multiple of RAAIMT (e.g., a product of RAAIMT and a multiplier). If the first counter 305 reaches the first threshold 315-a, no additional activate commands may be issued by a host or other device to the corresponding monitoring area (e.g., until one or more memory management commands 320 are issued thereto, which may reduce the first counter 305 below the first threshold 315-a). If the first counter 305 reaches a value of greater than or equal to (e.g., satisfies) the first threshold 315-a (e.g., a maximum counter value), any activate commands that may be issued to the corresponding monitoring area may be ignored. For example, if a host or other device issues an activate command to the monitoring area, the memory device may determine whether the first counter 305 satisfies the first threshold. If the first counter satisfies the first threshold, the memory device may ignore the activate command issued to the monitoring area, and suppress incrementing of the first counter.

In one example, a value of the first threshold 315-a may be 640 (e.g., 640 activate commands), such that a monitoring area may support 640 activate commands before additional activate commands are suppressed. In one example, the amount that the first counter 305 may be decremented by a memory management command 320 may be 160 (e.g., 160 activate commands), which may be a same value as an RAAIMT (e.g., and the first threshold 315-a may be a multiple of 4 of RAAIMT).

In some cases, a relatively higher quantity of memory management commands 320 issued to a memory device may result in increased power consumption and/or may be used as a hammering technique to support unauthorized access. For example, power consumption may be increased if memory management commands 320 are issued at a relatively higher frequency. Similarly, a hacker or other security risk may use memory management commands 320 to initiate a wear leveling cycle with an address scramble (e.g., an address scramble that uses a logical address to generate an intermediate address, which is then used in a wear leveling scheme to generate a physical address). For example, each memory management command 320 (e.g., or a majority thereof) may result in a wear leveling movement, which a hacker or other security risk may use to determine how data is moved across a memory array and how that movement is related to the address scramble, which may lead to deciphering the address scramble. Based on a knowledge of the address scramble, the hacker or other security risk may launch an attack to wear out one or more physical addresses (e.g., cause physical failure of one or more memory cells).

The present disclosure provides techniques for ignoring or suppressing one or more memory management commands 320, which may, for example, reduce power consumption and increase device security, while still upholding a remainder of the memory management commands 320 (e.g., to mitigate device wear). For example, the memory device may maintain a second counter 310 (e.g., in addition to the first counter 305) for each monitoring area, which may be used to determine whether to perform a memory management command 320 for the corresponding monitoring area. The second counter 310 may be incremented for each activate received for a corresponding monitoring area, and may be associated with a second threshold 315-b (e.g., which may have a value similar to or equal to the counter decrement value or RAADEC). In some cases, the second counter 310 may be implemented together with the first counter 305 (e.g., using same circuitry), while in some other cases, the second counter 310 may be implemented using different circuitry or components than the first counter 305.

If a memory management command 320 is received for a monitoring area, the second counter 310 for that monitoring area may be compared to the second threshold 315-b. If the second counter 310 satisfies (e.g., is greater than or equal to) the second threshold 315-b upon reception of the memory management command 320, the memory device may perform a memory management operation associated with the memory management command 320 and may decrement the first counter 305 and second counter 310 by a same amount (e.g., as described herein with reference to the first counter 305). If the second counter 310 fails to satisfy (e.g., is less than) the second threshold 315-b upon reception of the memory management command 320, the memory device may suppress (e.g., ignore) performance of a memory management operation associated with the memory management command 320. The memory device may also maintain a value of the second counter 310 in response to the memory management command 320, while decrementing the first counter 305.

Thus, the first counter 305 may be decremented for any received memory management command 320. In the examples described herein, the memory device may receive a quantity 330 of activate commands from a host device. In response, the memory device (e.g., the corresponding monitoring area) may perform an activate operation. The memory device may increment the first counter 305 and the second counter 310 (e.g., by one) for each of the activate commands issued. In some cases, if the first counter 305 is greater than or equal to (e.g., satisfies) the first threshold 315-a, the memory device may ignore any further activate commands (e.g., may not perform the corresponding activate operation) and may refrain from performing (e.g., suppress) any associated activate operations. In such cases, the memory device may also maintain (e.g., not increment) the first counter 305 and the second counter 310.

In the examples described herein, the memory device may also receive memory management commands 320 from a host device, for a respective monitoring area. The memory management commands 320 may be associated with a wear leveling scheme. In some cases, the frequency of or interval between (e.g., with respect to time, with respect to a quantity 330 of activate operations) the memory management commands 320 may be based on a parameter associated with the memory device (e.g., a second threshold 315-b, a second counter 310). For example, the parameter may be an example of the first counter 305, the second counter 310, or both where a value of the respective counter (e.g., relative to the second threshold 315-b) may indicate the frequency of, or interval between, the memory management commands 320.

In some examples, after receiving a quantity 330-a of activate commands (e.g., after power up), the memory device may receive a memory management command 320-a from the host device. In some cases, the first counter 305 and the second counter 310 may have a same value upon reception of the memory management command 320-a, where the first counter 305 and the second counter 310 may both be less than the second threshold 315-b. The first counter 305 may be decremented to zero in response to the memory management command 320-a. In some cases, the first counter 305 may be decremented to zero because the first counter 305 is less than a first quantity (e.g., less than the second threshold 315-b). The memory device may ignore the memory management command 320-a, and may suppress the memory management operation for the monitoring area because the second counter 310 is less than the second threshold 315-b (e.g., fails to satisfy the second threshold 315-b). The second counter 310 may maintain its value because the memory management command 320-a was ignored (e.g., because the second counter failed to satisfy the second threshold 315-b). After performing these operations, the first counter 305 and the second counter 310 may be separated by a difference 325-a. In some cases, the difference 325 (e.g., difference 325-a) between the first counter 305 and the second counter 310 may represent a historical (e.g., accumulated) difference between the first counter 305 and the second counter 310, which may be representative of a total insufficient number of activate commands issued before performing a memory management operation (e.g., over operation of the memory device).

In some examples, after receiving a quantity 330-b of additional activate commands (e.g., after the memory management command 320-a), the memory device may receive a memory management command 320-b from the host device. In some cases, the first counter 305 and the second counter 310 may be greater than the second threshold 315-b upon reception of the memory management command 320-b. The first counter 305 may be decremented by a first quantity (e.g., a value equal to the second threshold 315-b) in response to the memory management command 320-b. Because the second counter 310 is greater than the second threshold 315-b (e.g., satisfies the second threshold 315-b), the memory device (e.g., the monitoring area) may perform a memory management operation associated with the memory management command 320-b, and the second counter 310 may be decremented by the first quantity. The first counter 305 and the second counter 310 may be separated by a difference 325-b. In some examples, the difference 325-b may be equivalent to the difference 325-a.

In some examples, after receiving a quantity 330-c of additional activate commands (e.g., after the memory management command 320-b), the memory device may receive a memory management command 320-c from the host device. In some cases, the first counter 305 and the second counter 310 may be less than the second threshold 315-b upon reception of the memory management command 320-c. The first counter 305 may be decremented by the first quantity in response to the memory management command 320-c. Because the second counter 310 is less than the second threshold 315-b (e.g., fails to satisfy the second threshold 315-b), the memory device may ignore the memory management command 320-c, and may suppress the associated memory management operation for the monitoring area. The second counter 310 may maintain its value because the memory management command 320-c was ignored (e.g., because the second counter failed to satisfy the second threshold 315-b). After performing these operations, the first counter 305 and the second counter 310 may be separated by a difference 325-c, where the difference 325-c may be a sum of the difference 325-b and the first quantity.

In some examples, after receiving a quantity 330-d of additional activate commands (e.g., after the memory management command 320-c), the memory device may receive a memory management command 320-d from the host device. In some cases, the first counter 305 may be less than the second threshold 315-b upon reception of the memory management command 320-d. The first counter 305 may be decremented to zero in response to the memory management command 320-d. In some examples, the second counter 310 may be greater than the second threshold 315-b (e.g., may satisfy the second threshold 315-b) upon reception of the memory management command 320-d. Because the second counter 310 is greater than the second threshold 315-b (e.g., satisfies the second threshold 315-b), the memory device (e.g., the monitoring area) may perform an associated memory management operation, and the second counter 310 may be decremented by the first quantity. After performing these operations, the first counter 305 and the second counter 310 may be separated by a difference 325-d. In some examples, the difference 325-d may be the sum of the difference 325-c and the value of the first counter 305 upon reception of the memory management command 320-d, minus the first quantity.

In some cases, the memory device may receive a quantity 330e of activate commands. The memory device may perform the associated activate operations and increment the first counter 305 and the second counter 310 by a corresponding amount. In some examples, after reception of the quantity 330-e of activate commands, the second counter 310 may be equivalent to the first threshold 315-a. The memory device may also receive a quantity 330-f of activate commands (e.g., after reception of the quantity 330-e of activate commands). In some examples, the memory device may perform activate operations associated with the quantity 330-f of activate commands because the first counter 305 is less than the first threshold 315-a (e.g., fails to satisfy the first threshold 315-a). In some cases, the second counter 310 may be incremented, and may exceed the first threshold 315-a (e.g., by a value equivalent to the quantity of activate commands 330-f). In some examples, the quantity 330-f of activate commands may be equivalent to the difference 325-d, and, accordingly, the first counter 305 may be incremented to the value of the first threshold 315-a. In some cases, the memory device may ignore a subsequent quantity 330-g of activate commands because the first counter 305 is equivalent to the first threshold 315-a (e.g., satisfies the first threshold 315-a).

In some examples, the memory device may receive a memory management command 320-e from the host device, and the memory device may decrement the first counter 305 and the second counter 310 by the first quantity. For example, the memory device may perform the operation associated with the memory management command 320-e because the second counter 310 is greater than the second threshold 315-b. In some examples, after performing these operations, the first counter 305 and the second counter 310 may be separated by a difference 325-e, where the difference 325-e may be equivalent to the difference 325-d. The memory device may refrain from ignoring the quantity 330-h of activate commands received from the host device (e.g., may perform the associated activate operations) because the first counter 305 is less than the first threshold 315-a (e.g., fails to satisfy the first threshold 315-a).

Based on the techniques described herein, the memory device may suppress some memory management operations to one or more monitoring areas, such that memory management operations may occur at greater intervals (e.g., less frequently). For example, an interval between performance of memory management commands may be increased to a time (e.g., average time) between activate commands (e.g., tRC) multiplied by the second threshold 315-b (e.g., associated with RAADEC), which may represent a quantity of activate commands. The memory device may prevent (e.g., mitigate) at least some row hammering to the monitoring area, or a portion of the monitoring area, while supporting maintenance of the monitoring area (e.g., to mitigate the effects of wear leveling, using memory management commands). By suppressing some memory management operations, the memory device may improve device security. For example, the memory device may be less susceptible to a wear leveling attack, and it may take more time to break an address scramble associated with the memory device as memory management operations occur less frequently. Additionally or alternatively, the memory device may reduce power consumption by refraining from performing some memory management operations.

Figure 4:
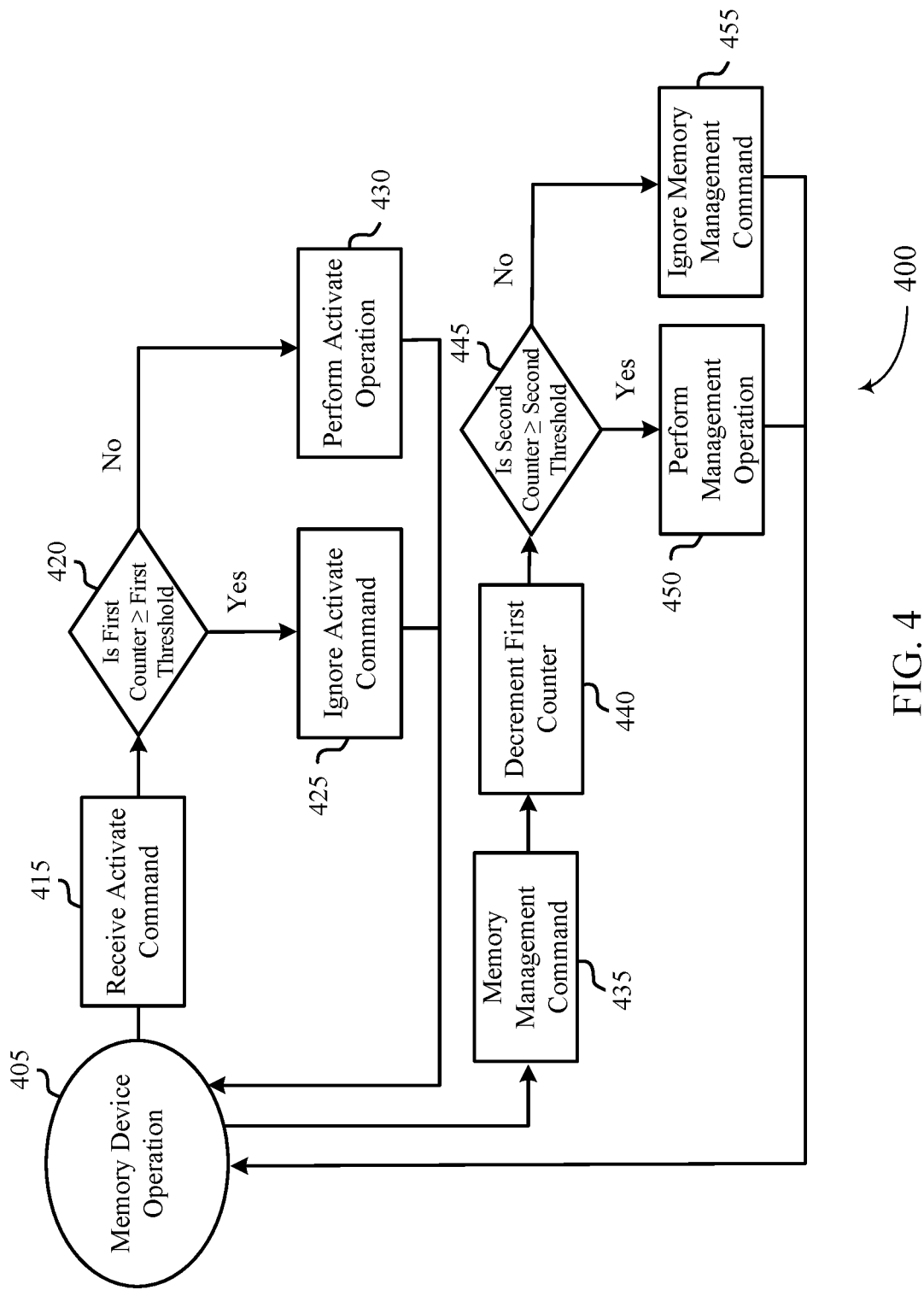
FIG. 4 illustrates an example of a flow chart that supports frequency regulation for memory management commands in accordance with examples as disclosed herein.

FIG. 4 illustrates an example of a flow chart 400 that supports frequency regulation for memory management commands in accordance with examples as disclosed herein. The flow chart 400 may be implemented by a memory device as described with reference to FIGS. 1-3. The memory device may be an example of a memory device 110 described with reference to FIG. 1, which may include one or more memory dies 200 as described with reference to FIG. 2.

As described with reference to FIG. 3, the memory device may include one or more monitoring areas, which may each include a respective set of one or more banks. The memory device may also maintain a respective first counter and a respective second counter associated with each monitoring area, which may be examples of the first counter and the second counter, respectively, as described with reference to FIG. 3. The memory device may also maintain a first threshold and a second threshold associated with the monitoring area(s), which may be respective examples of the first threshold and the second threshold as described with reference to FIG. 3. As described with reference to FIG. 3, the memory device may receive activate commands from a host device and may increment the first counter and the second counter (e.g., by one) for each of the activate commands issued.

In some cases, one or more aspects of the flow chart 400 may be implemented by a controller (e.g., among one or more other components), of the memory device. Additionally or alternatively, aspects of the flow chart 400 may be implemented as instructions stored in the memory device, or by circuitry of the memory device. For example, the instructions, if executed by a controller, may cause the memory device to perform one or more of the operations of the flow chart 400. Alternative examples of the flow chart 400 may be implemented in which some operations are performed in a different order than described, or are not performed at all. In some cases, operations may include features not mentioned below, or additional operations may be added.

At 405, the memory device may perform one or more operations, and may be referred to as being in a standby mode with respect to receiving activate commands, or other commands, from a host device. In some examples, the memory device may operate in the standby mode until the memory device receives an activate command (e.g., in association with a read command, write command). Additionally or alternatively, the memory device may operate in the standby mode until the memory device receives a memory management command.

At 415, the memory device may receive an activate command. For example, the memory device may receive the activate command from the host device. In some cases, the activate command may be associated with a monitoring area of the memory device. In some cases, the memory device may receive a plurality of activate commands, such that the activate command may be one of the plurality of activate commands.

At 420, the memory device may determine whether a value of the first counter is greater than or equal to the first threshold. At 425, if the memory device determines that the first counter is greater than or equal to the first threshold, the memory device may ignore the activate command for the monitoring area. In such cases, the memory device may maintain a value of the first counter and the second counter (e.g., without incrementing either counter). In some examples, the memory device may ignore the activate command because additional activate commands may increase a risk for malicious use of repeated access to the monitoring area (e.g., without performing additional memory management commands).

At 430, if the value of the first counter is less than the first threshold, the memory device may perform an activate operation for the monitoring area based on receiving the activate command. The memory device may increment the first counter and the second counter based on performing the activate operation. After ignoring the activate command, or performing the associated operation, the memory device may return to operation at 405. Other activate commands may be issued, such that the memory device may repeat the techniques of 415 and 420 for each received activate command (e.g., as well as performing one of the techniques of 425 or 430). The memory device may increment the first counter and the second counter (e.g., by one) for each of the plurality of activate commands that is received and for which an associated operation is performed (e.g., not ignored).

At 435, the memory device may receive a memory management command (e.g., a refresh management command). For example, the memory device may receive the memory management command from the host device. Additionally or alternatively, the memory device may generate the memory management command. In some cases, the memory management command may be associated with a wear leveling scheme for the monitoring area.

At 440, the memory device may decrement the first counter. In some examples, the memory device may decrement the first counter in response to receiving the memory management command. In some cases, the memory device may decrement the first counter by a first quantity (e.g., the value of second threshold). In other cases, the memory device may decrease the first counter to zero (e.g., if the first counter is less than the second threshold).

At 445, the memory device may determine whether a value of the second counter is greater than or equal to the second threshold. In some examples, the second threshold may be equivalent to the first quantity, or vice versa. At 450, if the second counter is greater than or equal to the second threshold, the memory device may perform a memory management operation (e.g., refresh management operation) based on the memory management command. Based on the second counter being greater than or equal to the second threshold, based on performing the memory management operation, or both, the memory device may decrement the second counter by the first quantity.

At 455, if the value of the second counter is less than the second threshold, the memory device may ignore the memory management command. Therefore, the memory device may suppress a memory management operation indicated by the command and associated with the monitoring area, when the second counter is less than the second threshold. Based on the second counter being less than the second threshold, based on suppressing performance of the memory management operation, or both, the memory device may maintain the value of the second counter. After suppressing the memory management operation, or performing the memory management operation, the memory device may return to operation at 405. Other memory management commands may be issued, such that the memory device may repeat the techniques of 435, 440, and 445 for each received memory management command (e.g., as well as performing one of the techniques of 450 or 455).

Figure 5:
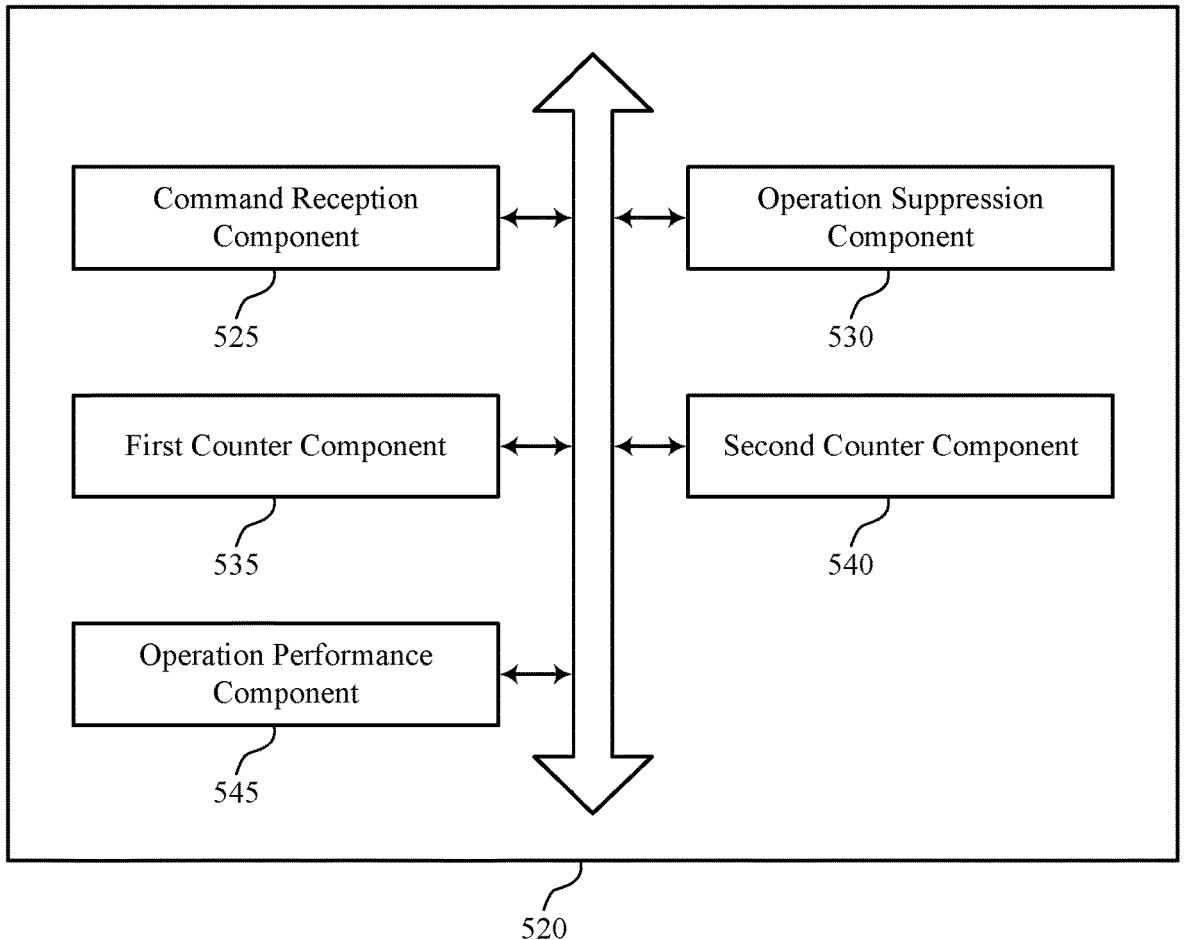
FIG. 5 shows a block diagram of a Memory device that supports frequency regulation for memory management commands in accordance with examples as disclosed herein.

FIG. 5 shows a block diagram 500 of a memory device 520 that supports frequency regulation for memory management commands in accordance with examples as disclosed herein. The memory device 520 may be an example of aspects of a memory device as described with reference to FIGS. 1 through 4. The memory device 520, or various components thereof, may be an example of means for performing various aspects of frequency regulation for memory management commands as described herein. For example, the memory device 520 may include a command reception component 525, an operation suppression component 530, a first counter component 535, a second counter component 540, an operation performance component 545, or any combination thereof. Each of these components may communicate, directly or indirectly, with one another (e.g., via one or more buses).

The command reception component 525 may be configured as or otherwise support a means for receiving, at a memory device, a plurality of activate commands for a set of banks of the memory device and a plurality of memory management commands for the set of banks. The operation suppression component 530 may be configured as or otherwise support a means for suppressing performance of at least one memory management operation associated with at least one memory management command of the plurality of memory management commands for at least one bank of the set of banks based at least in part on a parameter associated with the plurality of activate commands.

In some examples, the parameter is indicative of a frequency of memory management commands, or an interval between memory management commands, or both. In some examples, the parameter is indicative of a quantity of memory management commands performed for the set of banks, or an interval between memory management commands for the set of banks, or both.

In some examples, the first counter component 535 may be configured as or otherwise support a means for incrementing a first counter for each activate command of the plurality of activate commands based at least in part on a value of the first counter being below a first threshold. In some examples, the second counter component 540 may be configured as or otherwise support a means for incrementing a second counter for each activate command of the plurality of activate commands, where the second counter includes the parameter.

In some examples, the first counter component 535 may be configured as or otherwise support a means for decreasing the value of the first counter to zero or decreasing the value of the first counter by a first quantity based at least in part on reception of each of the plurality of memory management commands.

In some examples, the second counter component 540 may be configured as or otherwise support a means for determining that a first value of the second counter fails to satisfy a second threshold upon reception of the at least one memory management command, where suppressing performance of the at least one memory management operation is based at least in part on determining that the first value of the second counter fails to satisfy the second threshold. In some examples, the second counter component 540 may be configured as or otherwise support a means for maintaining the first value of the second counter based at least in part on determining that the first value of the second counter fails to satisfy the second threshold.

In some examples, the second counter component 540 may be configured as or otherwise support a means for determining that a second value of the second counter satisfies a second threshold upon reception of a second memory management command of the plurality of memory management commands. In some examples, the operation performance component 545 may be configured as or otherwise support a means for performing a second memory management operation associated with the second memory management command based at least in part on determining that the second value of the second counter satisfies the second threshold. In some examples, the second counter component 540 may be configured as or otherwise support a means for decreasing the second value of the second counter by a first quantity based at least in part on determining that the second value of the second counter satisfies the second threshold.

In some examples, the first quantity is equal to the second threshold. In some examples, the first counter component 535 may be configured as or otherwise support a means for decreasing the value of the first counter by the first quantity based at least in part on reception of the second memory management command. In some examples, each memory management command of the plurality of memory management commands is associated with a wear leveling scheme for the set of banks.

In some examples, the command reception component 525 may be configured as or otherwise support a means for receiving, at a memory device, a plurality of activate commands for a set of banks of the memory device. In some examples, the operation suppression component 530 may be configured as or otherwise support a means for suppressing performance of at least one activate operation associated with at least one activate command of the plurality of activate commands for at least one bank of the set of banks based at least in part on a parameter associated with the plurality of activate commands.

In some examples, the first counter component 535 may be configured as or otherwise support a means for incrementing a first counter for each activate command of the plurality of activate commands based at least in part on a value of the first counter being below a first threshold, where the first counter includes the parameter.

In some examples, the first counter component 535 may be configured as or otherwise support a means for determining that a first value of the first counter satisfies the first threshold upon reception of the at least one activate command, where suppressing performance of the at least one activate operation is based at least in part on determining that the first value of the first counter satisfies the first threshold. In some examples, the first counter component 535 may be configured as or otherwise support a means for maintaining the first value of the first counter based at least in part on determining that the first value of the first counter satisfies the first threshold.

In some examples, the command reception component 525 may be configured as or otherwise support a means for receiving one or more memory management commands for the set of banks. In some examples, the first counter component 535 may be configured as or otherwise support a means for decreasing the value of the first counter to zero or decreasing the value of the first counter by a first quantity based at least in part on reception of each of the one or more memory management commands.

In some examples, the first counter component 535 may be configured as or otherwise support a means for determining that a second value of the first counter fails to satisfy the first threshold upon reception of a second activate command following reception of the one or more memory management commands. In some examples, the operation performance component 545 may be configured as or otherwise support a means for performing a second activate operation associated with the second activate command based at least in part on determining that the second value of the first counter fails to satisfy the first threshold. In some examples, the first counter component 535 may be configured as or otherwise support a means for incrementing the second value of the first counter based at least in part on determining that the second value of the first counter fails to satisfy the first threshold.

In some examples, the second counter component 540 may be configured as or otherwise support a means for incrementing a second counter for each activate command of the plurality of activate commands.

In some examples, the second counter component 540 may be configured as or otherwise support a means for determining that a first value of the second counter fails to satisfy a second threshold upon reception of a first memory management command. In some examples, the operation suppression component 530 may be configured as or otherwise support a means for suppressing performance of a first memory management operation associated with the first memory management command based at least in part on determining that the first value of the second counter fails to satisfy the second threshold. In some examples, the second counter component 540 may be configured as or otherwise support a means for maintaining the first value of the second counter based at least in part on determining that the first value of the second counter fails to satisfy the second threshold.

In some examples, the second counter component 540 may be configured as or otherwise support a means for determining that a second value of the second counter satisfies a second threshold upon reception of a second memory management command. In some examples, the operation performance component 545 may be configured as or otherwise support a means for performing a second memory management operation associated with the second memory management command based at least in part on determining that the second value of the second counter satisfies the second threshold. In some examples, the second counter component 540 may be configured as or otherwise support a means for decreasing the second value of the second counter by a first quantity based at least in part on determining that the second value of the second counter satisfies the second threshold.

Figure 6:
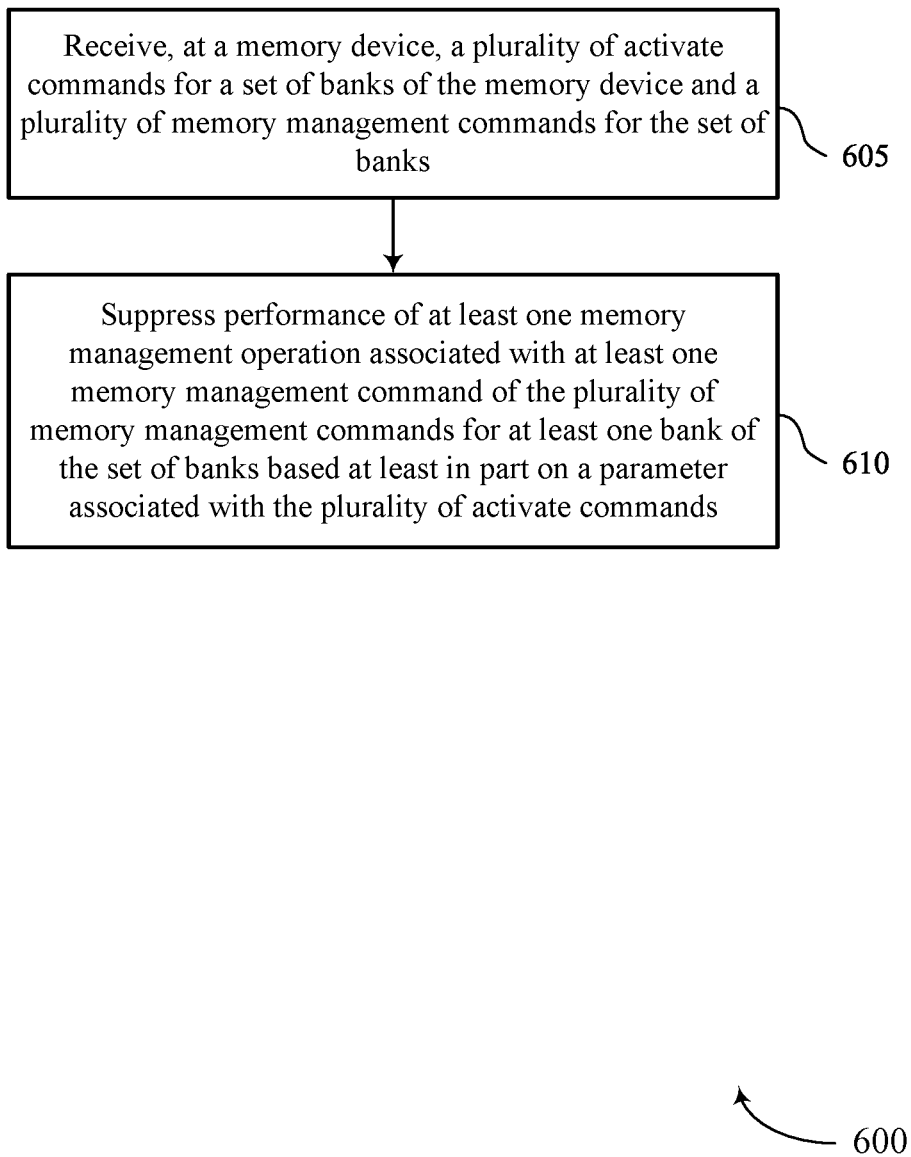
FIGS. 6 and 7 show flowcharts illustrating a method or methods that support frequency regulation for memory management commands in accordance with examples as disclosed herein.

FIG. 6 shows a flowchart illustrating a method 600 that supports frequency regulation for memory management commands in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include receiving, at a memory device, a plurality of activate commands for a set of banks of the memory device and a plurality of memory management commands for the set of banks. The operations of 605 may be performed in accordance with examples as disclosed herein. In some examples, aspects of the operations of 605 may be performed by a command reception component 525 as described with reference to FIG. 5.

At 610, the method may include suppressing performance of at least one memory management operation associated with at least one memory management command of the plurality of memory management commands for at least one bank of the set of banks based at least in part on a parameter associated with the plurality of activate commands. The operations of 610 may be performed in accordance with examples as disclosed herein. In some examples, aspects of the operations of 610 may be performed by an operation suppression component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, a plurality of activate commands for a set of banks of the memory device and a plurality of memory management commands for the set of banks and suppressing performance of at least one memory management operation associated with at least one memory management command of the plurality of memory management commands for at least one bank of the set of banks based at least in part on a parameter associated with the plurality of activate commands.

Aspect 2: The method, apparatus, or non-transitory computer-readable medium of aspect 1 where the parameter is indicative of a frequency of memory management commands, or an interval between memory management commands, or both.

Aspect 3: The method, apparatus, or non-transitory computer-readable medium of any of aspects 1 through 2, further including operations, features, circuitry, logic, means, or instructions, or any combination thereof for incrementing a first counter for each activate command of the plurality of activate commands based at least in part on a value of the first counter being below a first threshold and incrementing a second counter for each activate command of the plurality of activate commands, where the second counter includes the parameter.

Aspect 4: The method, apparatus, or non-transitory computer-readable medium of aspect 3, further including operations, features, circuitry, logic, means, or instructions, or any combination thereof for decreasing the value of the first counter to zero or decreasing the value of the first counter by a first quantity based at least in part on reception of each of the plurality of memory management commands.

Aspect 5: The method, apparatus, or non-transitory computer-readable medium of aspect 4, further including operations, features, circuitry, logic, means, or instructions, or any combination thereof for determining that a first value of the second counter fails to satisfy a second threshold upon reception of the at least one memory management command, where suppressing performance of the at least one memory management operation is based at least in part on determining that the first value of the second counter fails to satisfy the second threshold and maintaining the first value of the second counter based at least in part on determining that the first value of the second counter fails to satisfy the second threshold.

Aspect 6: The method, apparatus, or non-transitory computer-readable medium of any of aspects 3 through 5, further including operations, features, circuitry, logic, means, or instructions, or any combination thereof for determining that a second value of the second counter satisfies a second threshold upon reception of a second memory management command of the plurality of memory management commands; performing a second memory management operation associated with the second memory management command based at least in part on determining that the second value of the second counter satisfies the second threshold; and decreasing the second value of the second counter by a first quantity based at least in part on determining that the second value of the second counter satisfies the second threshold.

Aspect 7: The method, apparatus, or non-transitory computer-readable medium of aspect 6 where the first quantity is equal to the second threshold.

Aspect 8: The method, apparatus, or non-transitory computer-readable medium of any of aspects 6 through 7, further including operations, features, circuitry, logic, means, or instructions, or any combination thereof for decreasing the value of the first counter by the first quantity based at least in part on reception of the second memory management command.

Aspect 9: The method, apparatus, or non-transitory computer-readable medium of any of aspects 1 through 8 where each memory management command of the plurality of memory management commands is associated with a wear leveling scheme for the set of banks.

Figure 7:
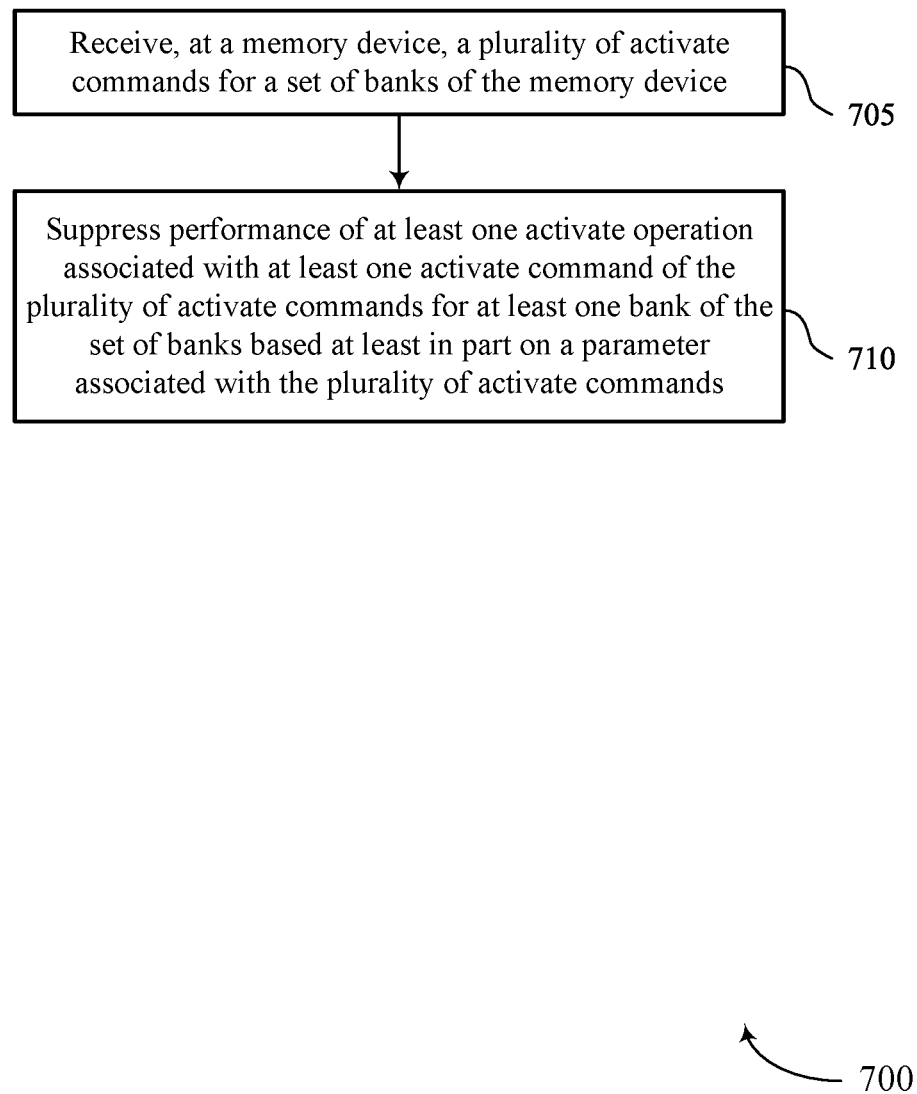

FIG. 7 shows a flowchart illustrating a method 700 that supports frequency regulation for memory management commands in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include receiving, at a memory device, a plurality of activate commands for a set of banks of the memory device. The operations of 705 may be performed in accordance with examples as disclosed herein. In some examples, aspects of the operations of 705 may be performed by a command reception component 525 as described with reference to FIG. 5.

At 710, the method may include suppressing performance of at least one activate operation associated with at least one activate command of the plurality of activate commands for at least one bank of the set of banks based at least in part on a parameter associated with the plurality of activate commands. The operations of 710 may be performed in accordance with examples as disclosed herein. In some examples, aspects of the operations of 710 may be performed by an operation suppression component 530 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for receiving, at a memory device, a plurality of activate commands for a set of banks of the memory device and suppressing performance of at least one activate operation associated with at least one activate command of the plurality of activate commands for at least one bank of the set of banks based at least in part on a parameter associated with the plurality of activate commands.

Aspect 11: The method, apparatus, or non-transitory computer-readable medium of aspect 10 where the parameter is indicative of a quantity of memory management commands performed for the set of banks, or an interval between memory management commands for the set of banks, or both.

Aspect 12: The method, apparatus, or non-transitory computer-readable medium of any of aspects 10 through 11, further including operations, features, circuitry, logic, means, or instructions, or any combination thereof for incrementing a first counter for each activate command of the plurality of activate commands based at least in part on a value of the first counter being below a first threshold, where the first counter includes the parameter.

Aspect 13: The method, apparatus, or non-transitory computer-readable medium of aspect 12, further including operations, features, circuitry, logic, means, or instructions, or any combination thereof for determining that a first value of the first counter satisfies the first threshold upon reception of the at least one activate command, where suppressing performance of the at least one activate operation is based at least in part on determining that the first value of the first counter satisfies the first threshold and maintaining the first value of the first counter based at least in part on determining that the first value of the first counter satisfies the first threshold.

Aspect 14: The method, apparatus, or non-transitory computer-readable medium of any of aspects 12 through 13, further including operations, features, circuitry, logic, means, or instructions, or any combination thereof for receiving one or more memory management commands for the set of banks and decreasing the value of the first counter to zero or decreasing the value of the first counter by a first quantity based at least in part on reception of each of the one or more memory management commands.

Aspect 15: The method, apparatus, or non-transitory computer-readable medium of aspect 14, further including operations, features, circuitry, logic, means, or instructions, or any combination thereof for determining that a second value of the first counter fails to satisfy the first threshold upon reception of a second activate command following reception of the one or more memory management commands; performing a second activate operation associated with the second activate command based at least in part on determining that the second value of the first counter fails to satisfy the first threshold; and incrementing the second value of the first counter based at least in part on determining that the second value of the first counter fails to satisfy the first threshold.

Aspect 16: The method, apparatus, or non-transitory computer-readable medium of any of aspects 12 through 15, further including operations, features, circuitry, logic, means, or instructions, or any combination thereof for incrementing a second counter for each activate command of the plurality of activate commands.

Aspect 17: The method, apparatus, or non-transitory computer-readable medium of aspect 16, further including operations, features, circuitry, logic, means, or instructions, or any combination thereof for determining that a first value of the second counter fails to satisfy a second threshold upon reception of a first memory management command; suppressing performance of a first memory management operation associated with the first memory management command based at least in part on determining that the first value of the second counter fails to satisfy the second threshold; and maintaining the first value of the second counter based at least in part on determining that the first value of the second counter fails to satisfy the second threshold.

Aspect 18: The method, apparatus, or non-transitory computer-readable medium of any of aspects 16 through 17, further including operations, features, circuitry, logic, means, or instructions, or any combination thereof for determining that a second value of the second counter satisfies a second threshold upon reception of a second memory management command; performing a second memory management operation associated with the second memory management command based at least in part on determining that the second value of the second counter satisfies the second threshold; and decreasing the second value of the second counter by a first quantity based at least in part on determining that the second value of the second counter satisfies the second threshold.

It should be noted that the methods described herein are possible implementations, and that the operations and the steps may be rearranged or otherwise modified and that other implementations are possible. Furthermore, portions from two or more of the methods may be combined.

An apparatus is described. The following provides an overview of aspects of the apparatus as described herein:

Aspect 19: An apparatus, including: one or more memory arrays; and a controller coupled with the one or more memory arrays and operable to cause the apparatus to: receive a plurality of activate commands for a set of banks of the one or more memory arrays and a plurality of memory management commands for the set of banks; and suppress performance of at least one memory management operation associated with at least one memory management command of the plurality of memory management commands for at least one bank of the set of banks based at least in part on a parameter associated with the plurality of activate commands.

Aspect 20: The apparatus of aspect 19, where the parameter is indicative of a frequency of memory management commands, or an interval between memory management commands, or both.

Aspect 21: The apparatus of any of aspects 19 through 20, where the controller is further operable to cause the apparatus to: increment a first counter for each activate command of the plurality of activate commands based at least in part on a value of the first counter being below a first threshold; and increment a second counter for each activate command of the plurality of activate commands, where the second counter includes the parameter.

Aspect 22: The apparatus of aspect 21, where the controller is further operable to cause the apparatus to: decrease the value of the first counter to zero or decrease the value of the first counter by a first quantity based at least in part on reception of each of the plurality of memory management commands.

Aspect 23: The apparatus of aspect 22, where the controller is further operable to cause the apparatus to: determine that a first value of the second counter fails to satisfy a second threshold upon reception of the at least one memory management command, where suppressing performance of the at least one memory management operation is based at least in part on determining that the first value of the second counter fails to satisfy the second threshold; and maintain the first value of the second counter based at least in part on determining that the first value of the second counter fails to satisfy the second threshold.

Aspect 24: The apparatus of any of aspects 21 through 23, where the controller is further operable to cause the apparatus to: determine that a second value of the second counter satisfies a second threshold upon reception of a second memory management command of the plurality of memory management commands; perform a second memory management operation associated with the second memory management command based at least in part on determining that the second value of the second counter satisfies the second threshold; and decrease the second value of the second counter by a first quantity based at least in part on determining that the second value of the second counter satisfies the second threshold.

Aspect 25: The apparatus of aspect 24, where the first quantity is equal to the second threshold.

Aspect 26: The apparatus of any of aspects 24 through 25, where the controller is further operable to cause the apparatus to: decrease the value of the first counter by the first quantity based at least in part on reception of the second memory management command.

Aspect 27: The apparatus of any of aspects 19 through 26, where each memory management command of the plurality of memory management commands is associated with a wear leveling scheme for the set of banks.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The terms "layer" and "level" used herein refer to an organization (e.g., a stratum, a sheet) of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, or materials. In some examples, one layer or level may be composed of two or more sublayers or sublevels.

As used herein, the term "electrode" may refer to an electrical conductor, and in some examples, may be employed as an electrical contact to a memory cell or other component of a memory array. An electrode may include a trace, a wire, a conductive line, a conductive layer, or the like that provides a conductive path between components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, from a host device and at a memory device, a plurality of activate commands for a set of banks of the memory device;
   receiving, from the host device and at the memory device, a plurality of memory management commands for the set of banks; and
   suppressing, at the memory device, performance of at least one memory management operation associated with at least one memory management command of the received plurality of memory management commands for at least one bank of the set of banks based at least in part on a parameter associated with the received plurality of activate commands.

2. The method of claim 1, wherein the parameter is indicative of a frequency of memory management commands, or an interval between memory management commands, or both.

3. The method of claim 1, further comprising:
   incrementing a first counter for each activate command of the plurality of activate commands based at least in part on a value of the first counter being below a first threshold; and
   incrementing a second counter for each activate command of the plurality of activate commands, wherein the second counter comprises the parameter.

4. The method of claim 3, further comprising:
decreasing the value of the first counter to zero or decreasing the value of the first counter by a first quantity based at least in part on reception of each of the plurality of memory management commands.

5. The method of claim 4, further comprising:
determining that a first value of the second counter fails to satisfy a second threshold upon reception of the at least one memory management command, wherein suppressing performance of the at least one memory management operation is based at least in part on determining that the first value of the second counter fails to satisfy the second threshold; and
maintaining the first value of the second counter based at least in part on determining that the first value of the second counter fails to satisfy the second threshold.

6. The method of claim 3, further comprising:
determining that a second value of the second counter satisfies a second threshold upon reception of a second memory management command of the plurality of memory management commands;
performing a second memory management operation associated with the second memory management command based at least in part on determining that the second value of the second counter satisfies the second threshold; and
decreasing the second value of the second counter by a first quantity based at least in part on determining that the second value of the second counter satisfies the second threshold.

7. The method of claim 6, wherein the first quantity is equal to the second threshold.

8. The method of claim 6, further comprising:
decreasing the value of the first counter by the first quantity based at least in part on reception of the second memory management command.

9. The method of claim 1, wherein each memory management command of the plurality of memory management commands is associated with a wear leveling scheme for the set of banks.

10. An apparatus, comprising:
one or more memory arrays; and
a controller coupled with the one or more memory arrays and operable to cause the apparatus to:
receive, from a host device and at a memory device, a plurality of activate commands for a set of banks of the memory device;
receive, from the host device and at the memory device, a plurality of memory management commands for the set of banks; and
suppressing, at the memory device, performance of at least one memory management operation associated with at least one memory management command of the received plurality of memory management commands for at least one bank of the set of banks based at least in part on a parameter associated with the received plurality of activate commands.

11. The apparatus of claim 10, wherein the parameter is indicative of a frequency of memory management commands, or an interval between memory management commands, or both.

12. The apparatus of claim 10, wherein the controller is further operable to cause the apparatus to:
increment a first counter for each activate command of the plurality of activate commands based at least in part on a value of the first counter being below a first threshold; and
increment a second counter for each activate command of the plurality of activate commands, wherein the second counter comprises the parameter.

13. The apparatus of claim 12, wherein the controller is further operable to cause the apparatus to:
decrease the value of the first counter to zero or decrease the value of the first counter by a first quantity based at least in part on reception of each of the plurality of memory management commands.

14. The apparatus of claim 13, wherein the controller is further operable to cause the apparatus to:
determine that a first value of the second counter fails to satisfy a second threshold upon reception of the at least one memory management command, wherein suppressing performance of the at least one memory management operation is based at least in part on determining that the first value of the second counter fails to satisfy the second threshold; and
maintain the first value of the second counter based at least in part on determining that the first value of the second counter fails to satisfy the second threshold.

15. The apparatus of claim 12, wherein the controller is further operable to cause the apparatus to:
determine that a second value of the second counter satisfies a second threshold upon reception of a second memory management command of the plurality of memory management commands;
perform a second memory management operation associated with the second memory management command based at least in part on determining that the second value of the second counter satisfies the second threshold; and
decrease the second value of the second counter by a first quantity based at least in part on determining that the second value of the second counter satisfies the second threshold.

16. The apparatus of claim 15, wherein the first quantity is equal to the second threshold.

17. The apparatus of claim 15, wherein the controller is further operable to cause the apparatus to:
decrease the value of the first counter by the first quantity based at least in part on reception of the second memory management command.

18. The apparatus of claim 10, wherein each memory management command of the plurality of memory management commands is associated with a wear leveling scheme for the set of banks.

19. A method, comprising:
receiving, from a host device and at a memory device, a plurality of activate commands for a set of banks of the memory device; and
suppressing, at the memory device, performance of at least one activate operation associated with at least one activate command of the received plurality of activate commands for at least one bank of the set of banks based at least in part on a parameter associated with the received plurality of activate commands.

20. The method of claim 19, wherein the parameter is indicative of a quantity of memory management commands performed for the set of banks, or an interval between memory management commands for the set of banks, or both.

21. The method of claim 19, further comprising:
incrementing a first counter for each activate command of the plurality of activate commands based at least in part on a value of the first counter being below a first threshold, wherein the first counter comprises the parameter.

22. The method of claim 21, further comprising:
determining that a first value of the first counter satisfies the first threshold upon reception of the at least one activate command, wherein suppressing performance of the at least one activate operation is based at least in part on determining that the first value of the first counter satisfies the first threshold; and
maintaining the first value of the first counter based at least in part on determining that the first value of the first counter satisfies the first threshold.

23. The method of claim 21, further comprising:
receiving one or more memory management commands for the set of banks; and
decreasing the value of the first counter to zero or decreasing the value of the first counter by a first quantity based at least in part on reception of each of the one or more memory management commands.

24. The method of claim 23, further comprising:
determining that a second value of the first counter fails to satisfy the first threshold upon reception of a second activate command following reception of the one or more memory management commands;
performing a second activate operation associated with the second activate command based at least in part on determining that the second value of the first counter fails to satisfy the first threshold; and
incrementing the second value of the first counter based at least in part on determining that the second value of the first counter fails to satisfy the first threshold.

25. The method of claim 21, further comprising:
incrementing a second counter for each activate command of the plurality of activate commands.

26. The method of claim 25, further comprising:
determining that a first value of the second counter fails to satisfy a second threshold upon reception of a first memory management command;
suppressing performance of a first memory management operation associated with the first memory management command based at least in part on determining that the first value of the second counter fails to satisfy the second threshold; and
maintaining the first value of the second counter based at least in part on determining that the first value of the second counter fails to satisfy the second threshold.

27. The method of claim 25, further comprising:
determining that a second value of the second counter satisfies a second threshold upon reception of a second memory management command;
performing a second memory management operation associated with the second memory management command based at least in part on determining that the second value of the second counter satisfies the second threshold; and
decreasing the second value of the second counter by a first quantity based at least in part on determining that the second value of the second counter satisfies the second threshold.

* * * * *